United States Patent [19]

Yes

[11] Patent Number: 4,674,538

[45] Date of Patent: Jun. 23, 1987

[54] DEVICE FOR REGULATING WATER FLOW IN A WATER FILTER

[76] Inventor: Johnson Yes, No. 9, She Tze Street, Shin Lin District, Taipei, Taiwan

[21] Appl. No.: 810,351

[22] Filed: Dec. 18, 1985

[51] Int. Cl.$^4$ ............................................. F16K 11/02
[52] U.S. Cl. ................... 137/625.46; 210/425
[58] Field of Search ............... 137/625.29, 625.31, 137/625.46; 210/278, 411, 425, 426

[56] References Cited

U.S. PATENT DOCUMENTS

| | | | |
|---|---|---|---|
| 282,213 | 7/1883 | Haynes | 210/425 X |
| 457,025 | 8/1891 | Burhorn | 210/425 |
| 2,170,975 | 8/1939 | Pick | 137/625.46 X |
| 2,631,811 | 3/1953 | Malloy | 137/625.31 X |
| 2,990,853 | 7/1961 | Sharp | 137/625.46 X |
| 4,115,276 | 9/1978 | Kelly | 210/425 |

*Primary Examiner*—Robert G. Nilson
*Attorney, Agent, or Firm*—Birch, Stewart, Kolasch & Birch

[57] ABSTRACT

The present invention relating to a device for regulating water flow in a water filter includes a valve base with six passages, a valve disc with two arcuate chambers rotatably disposed on the base in which the arcuate chambers may be arranged to communicate two pairs of the two adjacent of six passages of the base when the valve disc is turned to a predetermined position. The invention further includes a water inlet conduit adapted to be connected to a pump, an upper venting conduit for discharging water to a filter medium, a wash water outlet conduit, a clean water outlet conduit and a lower venting conduit which are communicated with the first, second, third, fifth and the sixth passages whereby the direction of water flow can be controlled by turning the valve disc to three predetermined positions. In this way, the clean water resulting from the filter process flow out from the clean water outlet conduit and the wash water resulting from both backwash process and filter process flow out from the wash water outlet conduit, forming a convenient arrangement in practical use.

5 Claims, 11 Drawing Figures

DEVICE FOR REGULATING WATER FLOW IN A WATER FILTER

BACKGROUND OF THE INVENTION

1. Field of the Invention

The present invention relates to a device for regulating water flow in a water filter, particularly concerning an improved valve device at a conjunction of six passages for controlling the direction of water flow of the water filter in three ways during its filter and backwash process.

2. Description of Background Art

Many water filters are designed with a four-way valve at a conjunction of four conduits including an outlet conduit which can control the water flow in the tank in two direction, so that the clean water resulting from the filter process and the wash or waste water resulting from the backwash process may be discharged from the same outlet conduit.

Some of the water filters are designed with an improved valve, at a conjunction of more conduits, including a new arrangement such that the clean water resulting from the filter process may be discharged from a clear water outlet conduit and the wash or waste water resulting from the backwash process may be discharged from another outlet conduit.

Although the latter water filter is an improvement over the former one, it still has the disadvantage that at the beginning of filter process subsequent to the backwash operation, the water flowing from the clean water outlet conduit is still not sufficiently clear since the filter bed has been disturbed during the backwash process. It takes from about 5 to 60 minutes for the filtered water coming out from the clean outlet conduit to change from murky to clear. There is no arrangement that can allow the dirty water resulting from the filter process to flow through the waste water outlet conduit.

SUMMARY OF THE INVENTION

With the above problems in mind, the general object of the invention is to provide a device for regulating water flow in a water filter tank which can control the water flow of the filter in three direction as follows:

(1) The clean water resulting from the filter process can be regulated to come out from the clean water outlet conduit.

(2) The wash or waste water resulting from the backwash process can be regulated to come out from the waste water outlet conduit.

(3) The murky water at the beginning of the filter process subsequent to the backwash operation, can be regulated to come out from the same waste water outlet conduit.

In order to achieve the aforesaid objects as well as other incidental objects and advantages, the invention includes a valve base with a top face and a surrounding side surface having first, second, third, fourth, fifth and sixth passages which are arranged, in series, in the valve base such that each has a first opening at the top face and a second opening at the side surface. The fourth passage is communicated with the sixth passage by means of a pipe disposed outside the valve base or a bore provided in the valve base, and the second opening of the fourth passage is sealed shut.

The invention further includes a conduit means connected to the valve base having a raw water inlet conduit adapted to be joined to a pump, an upper venting conduit for discharging water into a filtering medium, a wash water outlet conduit, a clean water outlet conduit and a lower venting conduit.

A valve disc, which has two arcuate chambers spaced apart annularly on it, is rotatably disposed on the base, and each arcuate chamber has two openings at the bottom side of the valve disc. The arcuate chambers communicate with two pairs of the two adjacent of the passages of the base when the valve disc is turned to a predetermined position.

The second openings of the first, second, third, fifth and sixth passages are communicated with the raw water inlet conduit, the upper venting conduit, the wash water outlet conduit, the clean water outlet conduit and the lower venting conduit respectively. One of the arcuate chambers is capable of communicating with the fifth and sixth passage, sixth and first passage or the first and second passage when another one of the arcuate chambers communicates with the first and second passage, the second and third passage or the third and fourth passage respectively, so that clean water resulting from the filter process can flow out through the clean water outlet conduit and wash water resulting from both the backwash process and the filter process can flow out through the wash water outlet.

BRIEF DESCRIPTION OF THE DRAWINGS

These and other advantages, objects and features of the present invention will become apparent from the following detailed description of the preferred embodiments with reference to the accompanying drawings, wherein.

DETAILED DESCRIPTION OF THE PREFERRED EMBODIMENT

The following is a detailed description of the best presently contemplated embodiment of the invention. This description is not to be taken in a limiting sense, but is made merely for the purpose of illustrating the general principles of the invention.

Figure 1:
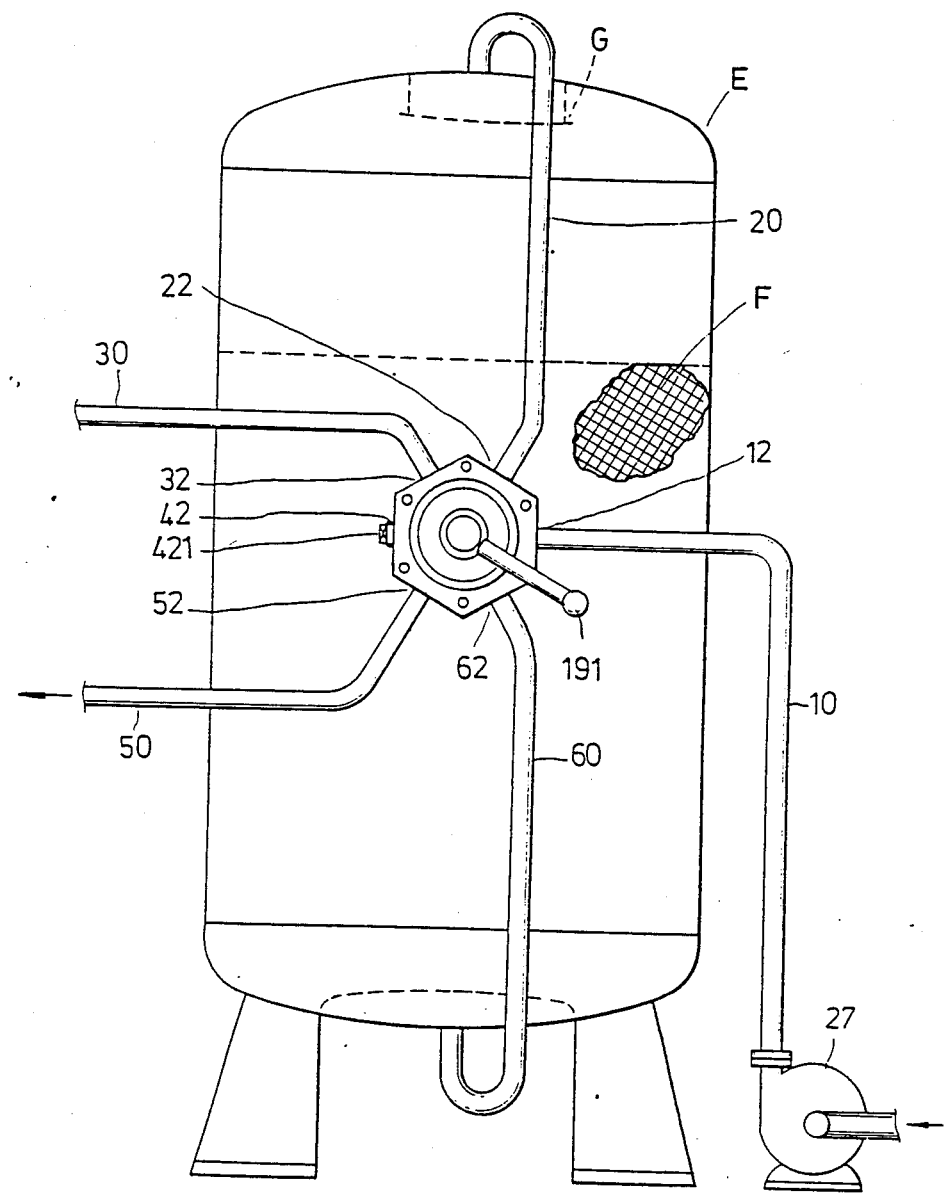
FIG. 1 is a perspective view of a preferred embodiment of a water filter provided with a regulating water flow device according to the invention.
Figure 2:
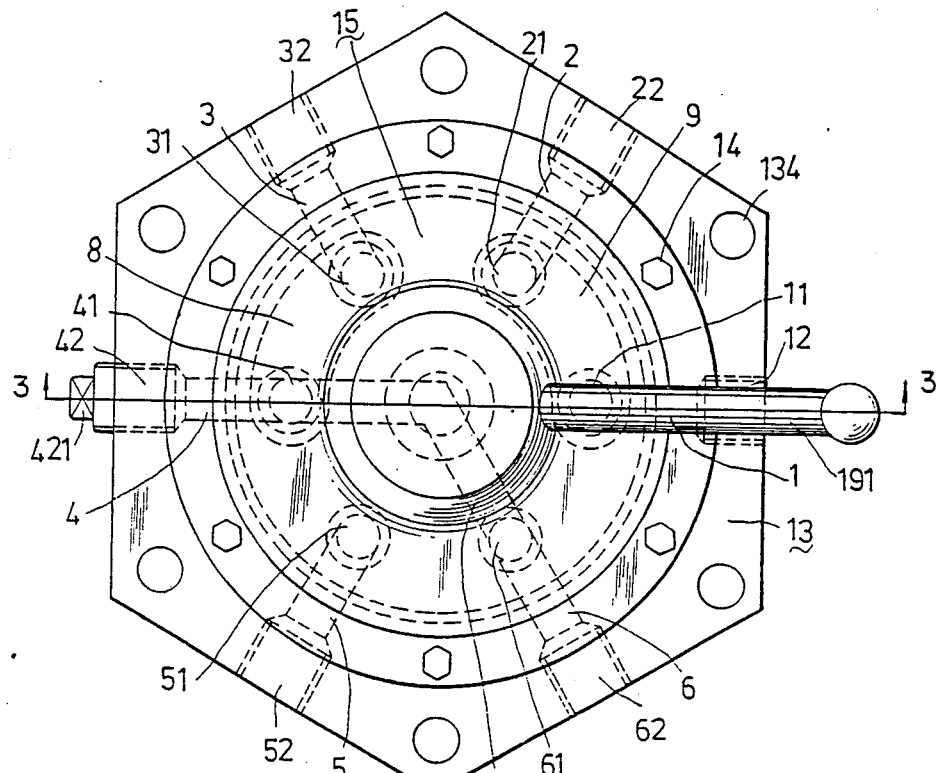
FIG. 2 is a top plan view of a valve according to the invention showing the arrangement of the six passages according to the invention.
Figure 3:
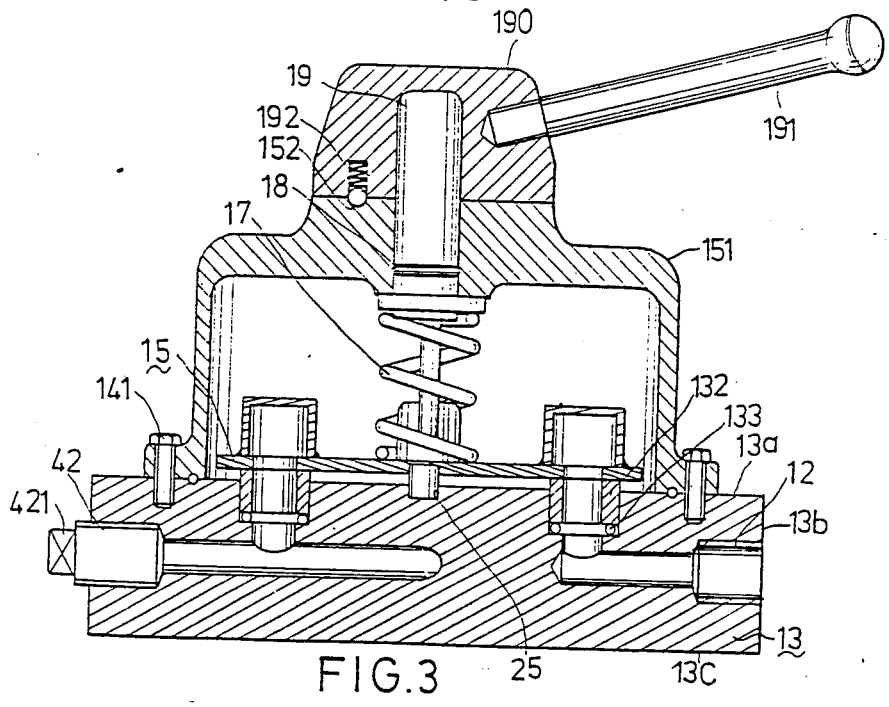
FIG. 3 is a cross-sectional view of a valve taken along the line 3—3 of FIG. 2.
Figure 4:
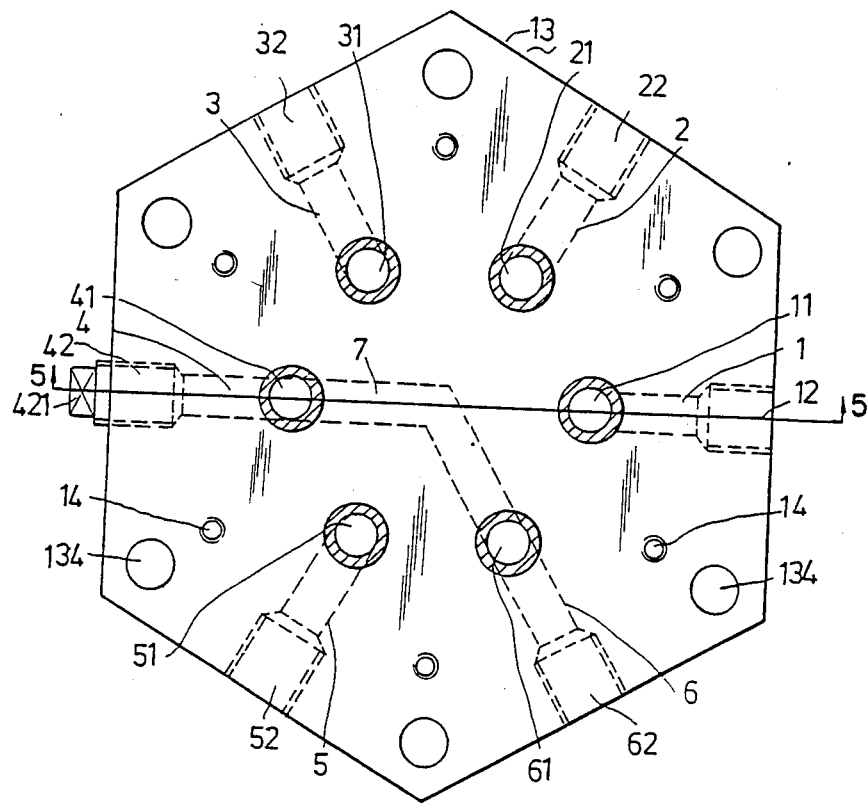
FIG. 4 is a top cross-sectional view of a valve base according to the invention showing the first opening and the second opening of its six passages.
Figure 5:
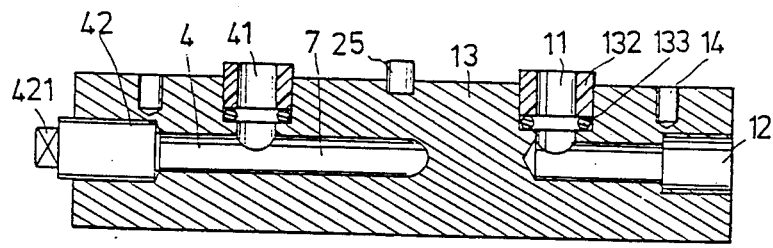
FIG. 5 is a side cross-sectional view taken from the line 5—5 of FIG. 4.
Figure 6:
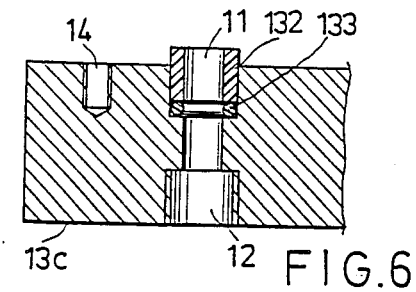
FIG. 6 is a partial cross-sectional view of one of six passages showing that the second opening can be arranged in another position.
Figure 7:
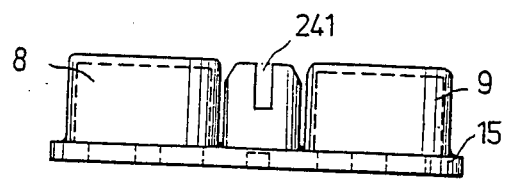
FIG. 7 is a side view of a valve disc of the valve according to the invention.
Figure 8:
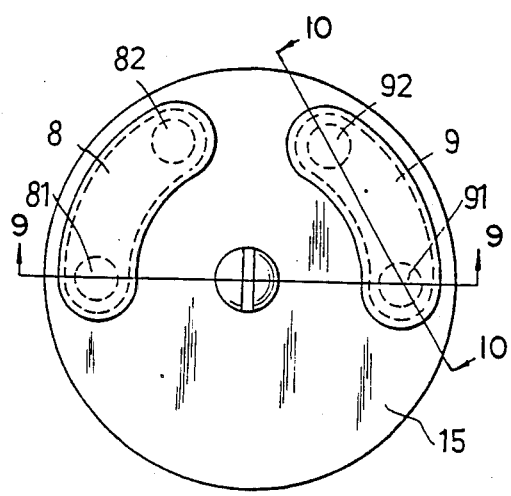
FIG. 8 is a top cross-sectional view of the valve disc of FIG. 7.
Figure 9:
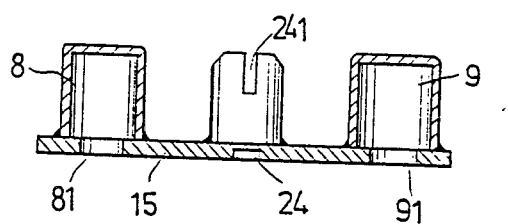
FIG. 9 is a cross-sectional view of the valve disc taken along the line 9—9 of FIG. 8.
Figure 10:
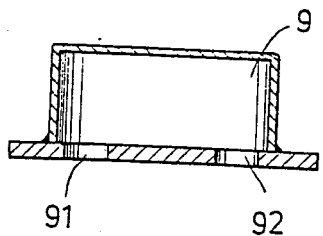
FIG. 10 is another cross-sectional view of the valve disc taken along the line 10—10 of FIG. 8.
Figure 11:
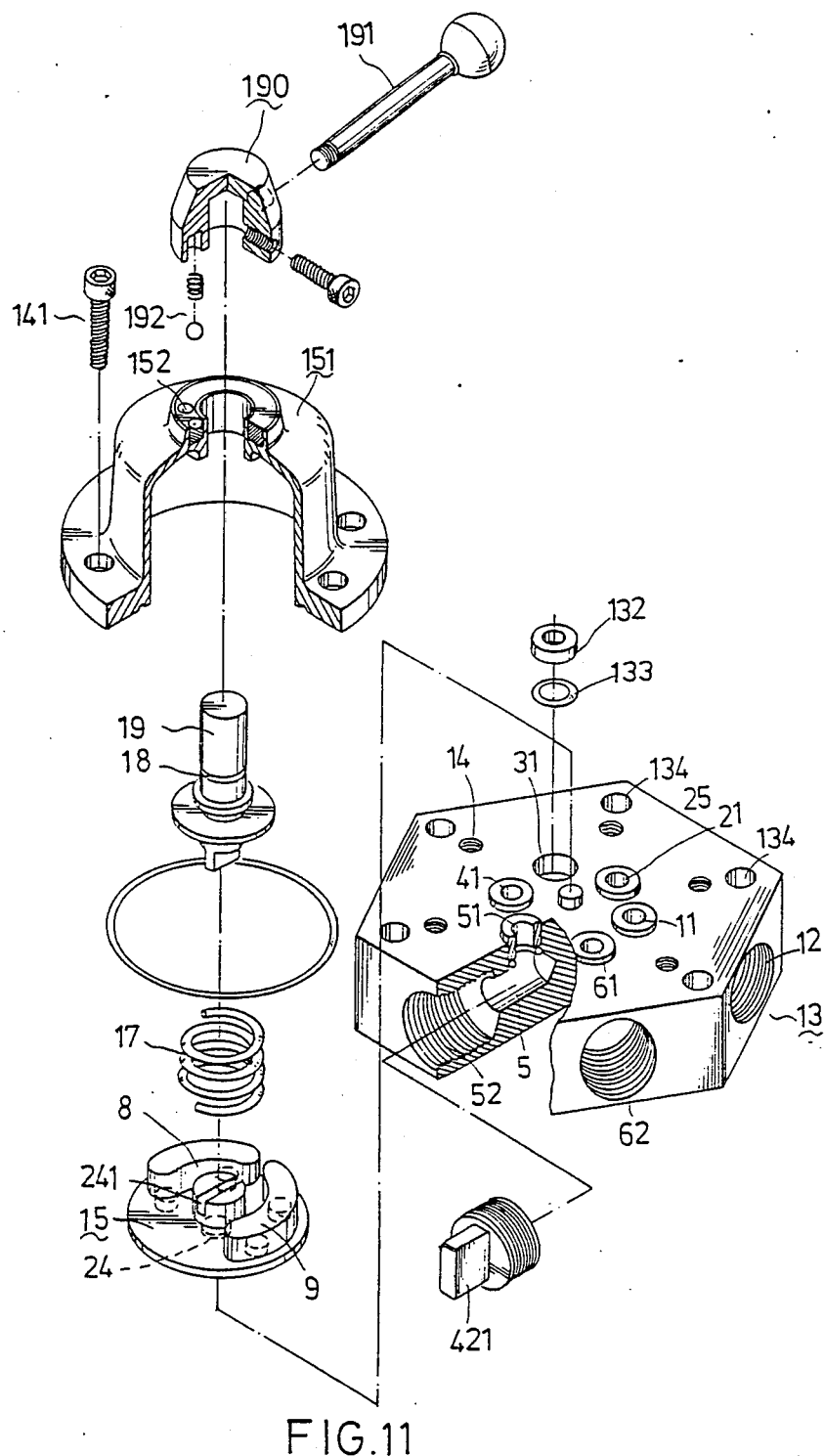
FIG. 11 is an exploded view of the valve according to the invention.

Referring to FIG. 1 in conjunction with all other remaining FIGS. 2, 3, 4, 5, 6, 7, 8, 9, 10, 11, the invention provides a valve base 13 with a top face 13a, a surrounding side surface 13b and a bottom face 13c having first 1, second 2, third 3, fourth 4, fifth 5 and sixth 6 passages which are arranged in series in the valve base 13 such that each has a first opening 11, 21, 31, 41, 51, 61 at the top face 13a and a second opening 12, 22, 32, 42, 52, 62 at the side surface 13b. The second openings 12, 22, 32, 42, 52, 62 also can be arranged at the bottom face 13c of the valve base as shown in FIG. 6. Each of the first ends 11, 21, 31, 41, 51, 61 has a wider cross-section than the passages 1, 2, 3, 4, 5, 6, respectively, and a rubber ring 133 and plastic socket 132 are received in each first end 11, 21, 31, 41, 51 and 61 that can prevent the water from leaking from each ends. The fourth passage 4 is communicated with the sixth passage 6 by means of a bore 7 provided in the valve base 13 or a pipe disposed outside the valve base 13 (not shown in Figs.) and the second opening 42 of the fourth passage 4 is sealed shut with a plug 421. The valve base 13 further has a central axis protrusion 25 at the center of its top face 13a. A plurality of screw holes 134 are provided through the valve base for fixing the base 13 to the tank E. Another series of screw holes 14 are spaced on the top face 13a of the base 13.

The invention further includes a conduit means connected to the valve base 13 having a raw water inlet conduit 10 adapted to be connected to a pump 27, an upper venting conduit 20 for discharging water to a filtering medium F, a wash water outlet conduit 30, a clean water outlet conduit 50 and a lower venting conduit 60.

A valve disc 15 is provided with two arcuate chambers 8, 9 spaced apart annularly on it, a first recess 241 at its top center and a second recess 24 at the center of its bottom side. The central axis protrusion 25 of the valve base 13 can be received in the second recess 24 and the valve disc 15 is rotatably disposed on the base 13. Each arcuate chamber 8, 9 has two openings 81 and 82, 91 and 92 at the bottom side of valve disc 15. The arcuate chambers 8, 9 can communicated with two ends of the two adjacent of the passages 1, 2, 3, 4, 5, 6 of the base 13 when the valve disc 15 is turned to a predetermined position. The valve disc 15 is covered by a cover 151 which is fixed to the base 13 by a plurality of screw 141 through the screw holes 14.

The invention further includes a controlling means for turning the valve disc 15 which has a biasing spring 17 disposed on the valve disc 15 at the center of its top face, a turnable axis 19 inserted in the first recess 241 of the valve disc 15 and biased by the spring 17. A rubber washer 18 provided on the upper portion of the turntable axis 19. The controlling means further has a dial 190 including a handle 191 rotatably disposed on the cover 151 which can turn the turnable axis 19 by the handle 191. Three small recess 152 are provided on the top face of the cover 151. The dial 190 further includes a spring bias ball 192 at its bottom which can be received in the recess 152 for setting the dial 190 in three poitions. In this way, the valve disc 15 can be turned to a predetermined position by means of the turntable axis 19 to control the water ways of the valve base 13.

The second openings 12, 22, 32, 52, 62 of the first 1, second 2, third 3, fifth 5, sixth 6 passages are communicated with the raw water inlet conduit 10, the upper venting conduit 20, the wash water outlet conduit 30, the clean water outlet conduit 50 and the lower venting conduit 60, respectively. One of the arcuate chambers 9 is capable of communicating with the fifth 5 and sixth 6 passage, sixth 6 and first 1 passage or the first 1 and second 2 passage, when another one of the arcuate chamber 8 communicates with the first 1 and second 2 passage, the second 2 and third 3 passage, or the third 3 and fourth 4 passage respectively. In this manner, clean water resulting from the filter process can flow out through the clean water outlet conduit 50 and wash water resulting from both the backwash process and the filter process can flow out through the wash water outlet conduit 30.

During the filter process, if the valve disc 15 is turned to a first position, the first passage 1 is communicated with the second passage 2 through the arcuate chamber 8, and the fifth passage 5 is communicated with the sixth passage 6 through the arcuate chamber 9. The raw water enters the water inlet conduit 10 through pump 27 and flows into the upper venting conduit 20. The water from the upper venting conduit 20 is discharged a baffle plate G at the top portion of the tank E under the opening of the conduit 20. The baffle plate G is arranged to prevent the filter medium F from being boiled by the water current. The raw water passes down through the filter medium F and flow into the lower venting conduit 60. The conduit 60 functions as a filtered water receiving conduit and the clean water continues to flow to the clean water outlet conduit 50 and thence to be discharged from the conduit.

After a period of the filter process, the filter medium F may become loaded with a heavy concentration of coagulated material previously filtered from the raw water, so the filter medium F needs to be backwashed. During the backwash process, if the valve disc 15 is turned to a second position, the first passage 1 communicates with the sixth passage 6 through the arcuate chamber 9 and the second passage 2 communicates with the third passage 3 through of the arcuate passage 8. The water flows from the inlet conduit 10 into the lower venting conduit 60. Now the conduit 60 functions as a backwash distributing conduit from which the water comes out and flows upwardly, so that the surface of the filter medium F rises and a heavy concentration of coagulated material previously filtered from the raw water begins to be lifted from the top surface of the filter medium F and enter the conduit 20. The backwash water now flows from conduit 20 through wash water outlet conduit 30, from which it dranis.

During the beginning of the filter process subsequent to the backwash process, the filtered water is still not clear, so that there needs to be an arrangement for the murky water to flow out from the wash water conduit 30. If the valve disc 15 is turned to a third position where the first passage 1 communicates with the second passage 2 through the arcuate chamber 9, and the third passage 3 communicates to the fourth passage 4 through the arcuate chamber 8, the murky water can be discharged from the wash water outlet conduit. In this process, the raw water enters the water inlet conduit 10 through pump 27 and flows into the upper venting conduit 20. The discharged water from the conduit 20 passes down through the filter medium F and flow into the lower venting conduit 60. As the sixth passage 6 and the fourth passage 4 are communicated each other through the bore 7, the murky water from conduit 60 flows into the fourth passage 4. The second end 42 of the fourth passage 4 is sealed shut with a plug 421 and the first end 41 of the fourth passage 4 is commuicated with the opening 81 of the arcuate chamber 8 so that the fourth passage 4 is communicated with passage 3 through the chamber 8. The murky water from conduit 60 flows through bore 7, the fourth passage 4, chamber 8 and the third passage 3 one after the other and flows out from the wash water outlet conduit 30.

By the above-described arrangement, clean water may flow out from the clean water outlet conduit 50 and murky water or wash water may be discharged from the wash water conduit 30, forming a convenient arrangement in practical use.

While this invention has been described with what are presently considered to be the most practical and preferred embodiments, it is to be understood that the invention is not to be limited to the disclosed embodiments, but on the contrary, is intended to cover various modifications and equivalent arrangements included within the spirit and scope of the appended claims, which scope is to be accorded the broadest interpretation so as to encompass all such modifications and equivalent structures.

I claim:

1. A device for regulating water flow in a water filter comprising:

a valve base with a top face and a surrounding side face having passage means extending from said top face to said side surface;

conduit means connected to said valve base including a raw water inlet conduit adapted to be connected to a pump, an upper venting conduit for discharging water to a filter medium, a wash water outlet conduit, a clean water outlet conduit and a lower venting conduit;

a valve disc, which has two arcuate chambers spaced apart annularly on the valve disc, rotatably disposed on said valve base, each arcuate chamber having two openings at the bottom side of said valve disc, said arcuate chambers communicating with two pairs of adjacent two of said passages of said base when said valve disc is turned to a predetermined position;

a controlling means for turning said valve disc;

wherein said passage means of said valve base includes first, second, third, fourth, fifth and sixth passages which are arranged in series in said base, each of which has a first open end opening at said top face and a second open end opening at said side surface, said fourth passage being communicated with said sixth passage and sealed shut at its second opening, said second openings of said first, second, third, fifth and sixth passages being communicated with said raw water inlet conduit, said upper venting conduit, said wash water outlet conduit, said clean water outlet conduit and said lower venting conduit respectively, one of said arcuate chambers being capable of communicating with said fifth and sixth passage, sixth and first passages, or first and second passage, when another one of said arcuate chambers communicates said first and second passages, second and third passage or third and fourth passage, so that clean water can flow out through said clean water outlet conduit and a wash water resulting from both backwash process and filter process can flow out through said wash water outlet.

2. A device according to claim 1, and further including detent means operatively connected to said controlling means for manually selectively retaining the valve disc in one of three positions.

3. A device according to claim 1, and further including a spring means for ensuring a tight connection between said valve disc and said valve base.

4. A device according to claim 1, and further including sockets disposed between said valve base and said valve disc for providing flow passages between said first, second, third, fourth, fifth and sixth passages and a selective arcuate chamber in said valve disc.

5. A device according to claim 1, and further including an axis protrusion extending from said valve base for engagement with an aperture in said valve disc to maintain alignment therebetween.

* * * * *